United States Patent
Cotter

(10) Patent No.: US 6,714,552 B1
(45) Date of Patent: Mar. 30, 2004

(54) COMMUNICATIONS NETWORK

(75) Inventor: David Cotter, Woodbridge (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/029,197

(22) PCT Filed: Aug. 12, 1997

(86) PCT No.: PCT/GB97/02160

§ 371 (c)(1),
(2), (4) Date: Feb. 25, 1999

(87) PCT Pub. No.: WO98/09403

PCT Pub. Date: Mar. 5, 1998

(30) Foreign Application Priority Data

Aug. 28, 1996 (GB) ................................. 9617907

(51) Int. Cl.[7] ........................ H04L 12/28; H04L 12/56
(52) U.S. Cl. ..................... 370/406; 370/408; 370/256; 370/389; 370/392; 359/135
(58) Field of Search ................................ 370/351, 238, 370/216, 228, 242, 244, 248, 390, 355, 408, 406, 256, 389, 392; 709/241, 238–239; 712/11, 25, 28; 359/135–139

(56) References Cited

U.S. PATENT DOCUMENTS

| | | | |
|---|---|---|---|
| 4,873,517 A | | 10/1989 | Baratz et al. |
| 5,021,947 A | * | 6/1991 | Campbell et al. ............. 712/25 |
| 5,103,447 A | * | 4/1992 | Takiyasu et al. ............ 370/460 |
| 5,297,137 A | | 3/1994 | Ofek et al. |
| 5,383,164 A | | 1/1995 | Sejnowski et al. |
| 5,455,854 A | | 10/1995 | Dilts et al. |
| 5,477,444 A | | 12/1995 | Bhat et al. |
| 5,490,232 A | | 2/1996 | Asano et al. |
| 5,506,714 A | * | 4/1996 | Nishio ......................... 359/139 |
| 5,509,123 A | | 4/1996 | Dobbins et al. |
| 5,524,176 A | | 6/1996 | Narita et al. |
| 5,559,707 A | | 9/1996 | DeLorme et al. |
| 5,561,790 A | | 10/1996 | Fusaro |
| 5,586,219 A | | 12/1996 | Yufik |
| 5,636,328 A | | 6/1997 | Kautz et al. |
| 5,664,066 A | | 9/1997 | Sun et al. |
| 5,822,301 A | | 10/1998 | Arnold et al. |
| 5,825,772 A | * | 10/1998 | Dobbins et al. ............ 370/396 |
| 6,078,946 A | * | 6/2000 | Johnson ...................... 709/200 |

OTHER PUBLICATIONS

Whalen et al., "Finding maximal link disjoint paths in a multigraph", Global Telecommunications Conference, 1990, and Exhibition. 'Communications: Connecting the Future', Globecom '90., IEEE, 1990, vol. 1, pp.: 470–474.*

Yener et al, "Design and Performance of Convergence Routing on Multiple Spanning Trees", Proceedings of the Global Telecommunications Conference (Globecom), San Francisco, Nov. 8–Dec. 2, 1994, vol. 1 of 3, Nov. 28, 1994, Institute of Electrical and Electronics Engineers, pp. 169–175, XO000488537.

(List continued on next page.)

Primary Examiner—Dang Ton
Assistant Examiner—Ronald Abelson
(74) Attorney, Agent, or Firm—Nixon & Vanderhye P.C.

(57) ABSTRACT

A communications network, suitable, for example, for linking computer processors, is formed from a number of nodes and links. The nodes and links are configured as a multiplicity of directed trails. Each directed trail spans some only of the nodes, but in combination the directed trails span every node of the network. Packets are routed through the network by selecting the appropriate one of the directed trails which links the source node and destination node, and by outputting the packet at the source node onto the selected trail. The nodes throughout the network may switch between predetermined and prescheduled switching states, and a given trail may be selected by choosing appropriately the time slot in which the packet is put onto the network. The network may be a photonic network carrying optical packets.

30 Claims, 9 Drawing Sheets

OTHER PUBLICATIONS

Zhang et al, "Performance Analysis of Multihop Lightwave Networks With Hot Potato Routing and Distance–Age–P{riorities", Networking in the Nineties, Bal Harbour, Apr. 7–11, 1991, vol. 3, Apr. 7, 1991, Institute of Electrical and Electornics Engineers, pp. 1012–1021, XP000223429.

Stamoulis et al, "Efficient Routing Schemes For Multiple Broadcasts in Hypercubes", IEEE Transactions on Parallel and Distributed Systems, vol. 4, No. 7, Jul. 1, 1993, pp. 725–739, XP000397939.

Yener et al, "Topological Design of Loss–Free Switch–Based Lans", Proceedings of INFOCOM '95—Conference on Computer Communications, Fourteenth Annual Joint Conference of the IEEE Computer and Communications Societies, Boston Apr. 2–6, 1995, vol. 3, Apr. 2, 1995, Institute of Electrical and Electronics Engineers, pp. 88–96, XP000580567.

* cited by examiner

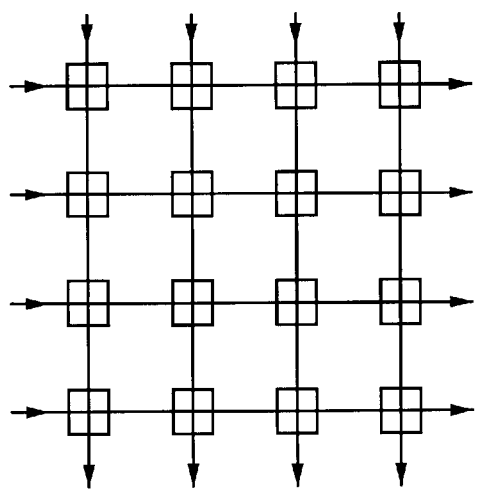 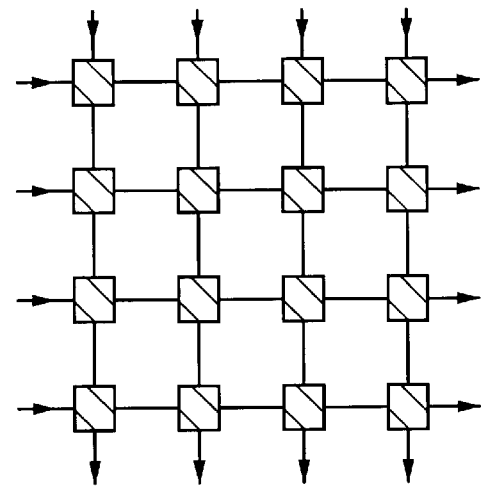
Fig. 8A  Fig. 8B
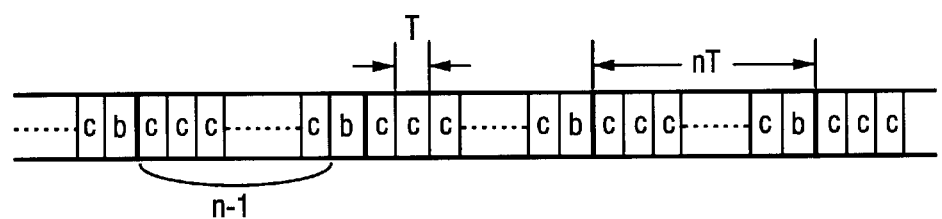
Fig. 9

COMMUNICATIONS NETWORK

BACKGROUND TO THE INVENTION

1. Field of the Invention
2. Related Art

The present invention relates to a communications network, and in particular to the routing of packets in a network.

There is a need for high speed packet networks for use, for example, in local area networks for interconnecting computer systems, or for use as part of the internal infrastructure of a multiprocessor computer. It has been proposed to implement such networks using ultrafast photonic technology. In implementing the network, the provision of an appropriate routing mechanism for the packets has proved to be a particularly critical design problem. There are a number of potentially conflicting requirements which have to be satisfied by any routing mechanism. In particular, it is desirable that the processing overhead at each node should be kept low: otherwise, the time required to process the packet limits the throughput of the node and hence of the network. However, it is also desirable to ensure that the routing mechanism is as efficient as possible in selecting the shortest paths for packets from a source to a given destination. If the efficiency of the routing mechanism is poor, then congestion in the network rises. This again serves to limit the throughput of the network.

Many different approaches to packet routing have been proposed and studied [1–3]. By selecting a suitable network topology the decision making associated with routing can be greatly simplified. This then meets the first of the requirements identified above, by ensuring a low processing overhead. Some network topologies allow "one-dimensional" routing. For example, in a uni-directional ring the source simply places a packet onto the ring and the packet eventually reaches its destination without requiring any routing decision by intermediate nodes. One-dimensional routing may also be used, for example, on buses or rings with bi-directional links. However, although one dimensional routing offers a number of attractive features, it suffers a serious limitation in that there is poor scaling of the relative routing efficiency and maximum throughput of the network as the number of nodes in the network is increased.

As an alternative to the use of one-dimensional network topologies, multi-dimensional networks may be used. The main advantage of using a multi-dimensional network, such as a two-dimensional torus network, is that there is a multiplicity of paths available between any pair of nodes on the network. It is therefore possible to adopt a routing method that selects the shortest available path, and such a method in general will have a higher relative routing efficiency and a higher value for the maximum throughput. However, existing methods of routing on multi-dimensional networks have their own serious drawbacks. Because the routing methods can select from a multiplicity of paths through the network it is possible for two or more packets to attempt to occupy the same link simultaneously. The method therefore needs to be capable of resolving the contention that arises in this case. This may be done either by using buffering within the network to store one or more of the packets until the link is free, or by deflecting one or more packets away from its optimal path, the technique known as deflection routing [1,7] Buffering can successfully maintain the packets in their correct sequence during their journey across the network. Buffering is however an unattractive solution for high-speed networks, because it introduces variable and unpredictable delay and adds to the control complexity and cost. In the case of photonic networks, there are severe technological limitations to the construction of buffers. Deflection routing does not suffer these technological limitations and is much easier to control, but deflection also causes packets to suffer variable and unpredictable delays. The packets may therefore be delivered to the destination in an incorrect sequence. A further limitation of conventional multi-dimensional networks and routing mechanisms is that it is difficult to achieve broadcasting to the nodes without using higher level transport control layers. The use of higher level transport control layers is undesirable as it introduces substantial processing delays.

The paper by Yener, B. et al., PROCEEDINGS OF THE GLOBAL TELECOMMUNICATIONS CONFERENCE (GLOBECOM), SAN FRANSISCO, NOV. 28 DEC. 2, 1994, vol. 1 of 3, IEEE, pp 169–175, and patent U.S. Pat. No. 5,297,137, discuss the use of multiple spanning trees to enhance the fault tolerance of a switch-based network. The use of two virtual rings is proposed. Each ring is embodied by an edge-disjoint spanning tree of the network and each virtual ring therefore spans every node of the network. It is therefore not possible to. route a packet efficiently simply by choosing one of the virtual rings at the outset. As a packet passes through the network, routing is carried out in a conventional fashion by making a local routing decision at intermediate nodes.

The paper by ZHENSHENG ZHANG et al, published in NETWORKING IN THE NINETIES, Bal Harbour, Apr. 7–11, 1991, vol. 3, 7 April 1991, IEEE, pp 1012–1021 discloses a network which is synchronised so that the transmissions of all the nodes begin in the start of a time slot. However, although the switching of nodes is to this extent pre-scheduled, the switching between different states is not predetermined. That is to say, it is not possible to predict in advance that a certain switch will be in a certain state at a given instant. Rather, whether or not a switch changes from one state to another in a given time slot is determined by a local routing decision made using a hot potato algorithm. The switch state therefore depends on local traffic conditions.

SUMMARY OF THE INVENTION

According to a first aspect of the present invention, there is provided a method of routing a packet in a communications network which comprises a multiplicity of nodes and links, and in which the nodes and links are configured as a multiplicity of directed trails, each directed trail linking some only of the multiplicity of nodes and the directed trails in combination spanning every node of the network, the method comprising:

a) selecting a directed trail T from the multiplicity of directed trails in dependence upon the destination of a packet, the selected trail including the source node and destination node of the packet; and b) outputting the packet at the source node onto the selected one of the ultiplicity of directed trails.

The present invention provides a fundamentally new approach to packet routing in multi-dimensional communications networks. It potentially offers all the advantage of one-dimensional routing, whilst overcoming the crucial disadvantage of poor scalability of routing efficiency and of the maximum throughput. It also completely avoids the need for contention resolution within the network.

The invention uses a method termed by the inventor "directed trail routing". This takes advantage of the fact that a network having an appropriate topology, as further described below, can be divided into a set of distinct trails, such that no one single trail spans all of the network, but there is always one trail which leads from a given source node to a given destination node. Routing can then be carried out simply by selecting the appropriate trail linking a source node to the desired destination node. Once on the trail, the packet can be routed in a quasi-one-dimensional fashion. As in one-dimensional routing, and by contrast with the prior art approaches in the papers by Yener et al. and Zhang et al., the source node selects the entire trail from the source to the destination before sending the packet.

Preferred implementations of the invention offer the advantages of very simple processing and routing nodes which may be based on simple header-word recognition. Message delivery time is dominated by the speed of light delay. No contention is required within the network, there is no need for buffering within the network and the network is free of deadlock or livelock. Nodes in the network can be named in an arbitrary fashion. Networks embodying the present invention offer efficient routing and good throughput and these advantages are maintained as the method is scaled for larger networks. Using the invention, there is zero delay variation and packets can be delivered in the correct sequence. The invention can support both connectionless (datagram) and connection-orientated modes and in connection-orientated mode provides guaranteed bandwidth. The method also makes physical-layer broadcasting practical.

Preferably the method includes reading the destination address at each node traversed by the packet.

In preferred implementations of the invention, the only processing required at the node is that needed to determine whether or not the packet address matches the node address.

Preferably each intermediate node forwards a packet which is received at the intermediate node and which is addressed to another node in a direction which is predetermined and independent of any information carried by the packet.

An important advantage of the present invention is that it enables intermediate nodes to function without requiring any processing of the packet beyond that necessary to determine whether or not the packet destination address corresponds to the node address.

Preferably the packet is an optical packet carried on a photonic network.

Although the present invention is not limited in applicability to systems operating in the optical domain, it does offer special advantages when used with ultrafast photonic networks. It enables efficient use of the bandwidth offered by such networks, while avoiding the disadvantages of using deflection routing or the technological problems associated with the provision of optical buffers.

Preferably each directed trail in the network is a subgraph of at least one closed directed trail and consists of a directed cycle or union of a plurality of connected directed cycles from a link-disjoint directed-cycle decomposition of the network. Preferably the step of selecting a directed trail T includes synchronising the initial despatch of the packet with prescheduled switching at an intermediate node.

It is found that a particularly effective way of routing a packet along a trail formed from a number of directed cycles is to switch the optical output of the intermediate nodes at prescheduled times e.g. with a fixed periodicity, so as to connect one cycle to another cycle. The source node then determines the trail followed by the packet by outputting the packet at a time determined in relation to the switching schedule so that, at a desired node, it is switched from one cycle to the next cycle in the trail. Preferably the switching occurs at a point of connection between cycles from a link-disjoint directed-cycle decomposition of the network. Preferably the nodes switch in synchronism throughout the network between pre-scheduled pre-determined switching states. For example, in the 4×4 torus network described below, a crossbar switch is associated with each node. All the crossbar switches are normally set to the cross state and repeatedly, at predetermined intervals, the crossbar switches are set to the bar state.

Although the use of temporal switching is preferred, the invention is not limited solely to such techniques. The invention might be implemented, for example, using wavelength-switching instead.

Preferably a timing sequence for the prescheduled switching of intermediate nodes comprises a frame divided into a plurality of time slots, and a source node outputs a packet onto the network in a selected one of the plurality of time slots within the timing frame, and the length of the link between successive nodes in a trail is such that a packet leaving one node in a first time slot arrives at the next successive node in a second time slot. For example, the packet may be advanced or retarded by one time slot as it passes from one node to the next.

According to a second aspect of the present invention there is provided a communications network comprising:
  a) a multiplicity of nodes and links which are configured as a multiplicity of directed trails each of which spans some only of the multiplicity of nodes and the multiplicity of directed trails in combination spanning every node of the network and including at least one directed trail linking each source node and each destination node in the network;
  b) means for selecting a directed trail T from the multiplicity of directed trails in dependence upon the destination of a packet; the selected trail including the source node and destination node of the packet; and
  c) means for outputting the packet at the source node onto the selected one of the multiplicity of directed trails.

According to a third aspect of the present invention there is provided a communications network comprising:
  a) a multiplicity of nodes and links which are configured as a multiplicity of directed trails each of which spans some only of the multiplicity of nodes and the multiplicity of directed trails in combination spanning every node of the network and including at least one directed trail linking each source node and each destination node in the network;
  b) a routing controller arranged to select, in dependence upon the destination of a packet, a directed trail T from the multiplicity of directed trails, which directed trail includes the source node and destination node of the packet;
  c) an input for receiving packets for transmission on the network; and
  d) an output connected to the said input for receiving packets and connected to the routing controller and arranged to output a packet received at the said input onto a selected one of the said multiplicity of directed trails.

According to a fourth aspect of the present invention, there is provided an optical communications network comprising:
  a) means for selecting a time slot for a packet in dependence upon the desired path for the packet through the network;

b) means for outputting the packet onto the network at a source node in the time slot selected by the means for selecting;

c) means for switching periodically the routing states of a multiplicity of routing nodes;

d) at the network nodes, means for switching the packet to different outputs according to the routing state of the respective node in the time slot in which the packet arrives at the node; and e) means for receiving the packet at a destination node.

According to a fifth aspect of the present invention there is provided a method of routing an optical packet from a source node to a destination node in an optical communications network, comprising:

a) selecting a time slot for a packet in dependence upon the desired path for the packet through the network;

b) outputting the packet onto the network at a source node in the time slot selected in step (a);

c) switching periodically the routing states of a multiplicity of routing nodes;

d) as the packet traverses the network, at the different nodes switching the packet to different outputs according to the routing state of the respective node in the time slot in which the packet arrives at the node; and e) receiving the packet at a destination node.

The present invention also encompasses multiprocessor computer systems, local area networks, metropolitan area networks, campus networks and communications switches using networks in accordance with the preceding aspects of the invention.

BRIEF DESCRIPTION OF THE DRAWINGS

Systems embodying the present invention will now be described in further detail, by way of example only, and will be contrasted with the prior art, with reference to the accompanying drawings in which:

FIGS. 8a and 8b are diagrams showing torus networks using crossbar switches with the switches set to the cross and bar state respectively;

FIG. 9 is a timing diagram showing packet time slots arranged in a frame 10 structure;

Detailed Description of Exemplary Embodiments

Figure 1:
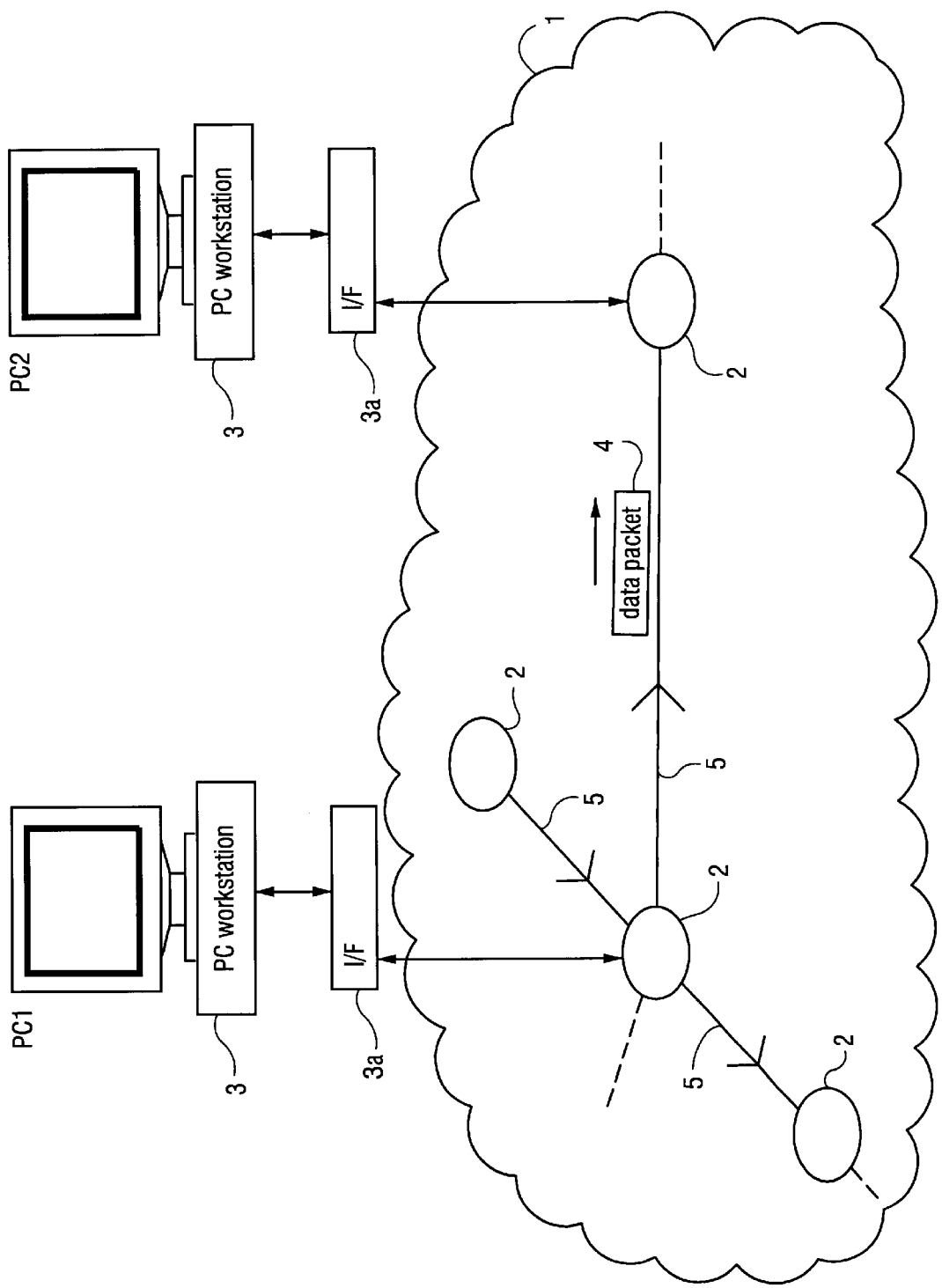
FIG. 1 is a schematic of a first example of a communications network.

With reference to FIG. 1, an optical communications network comprises a LAN 1 linking a number of personal computer workstations 3. Each workstation is connected to the LAN via a network interface 3a. The workstations and LAN together provide a visualisation of complex data. Each workstation is connected to a respective node 2 of the network. Packets of data 4 are communicated between the workstations 3 via the nodes 2 and links 5. In this example, the links 5 are formed from optical fibre and transmit the packets 4 in the optical domain.

Although, for ease of illustration, only a few nodes are shown in the FIGURE, in practice, the network may comprise many hundreds of nodes.

In this first example, the nodes and the interconnecting fibres are configured as an n×n torus network.

Figure 4:
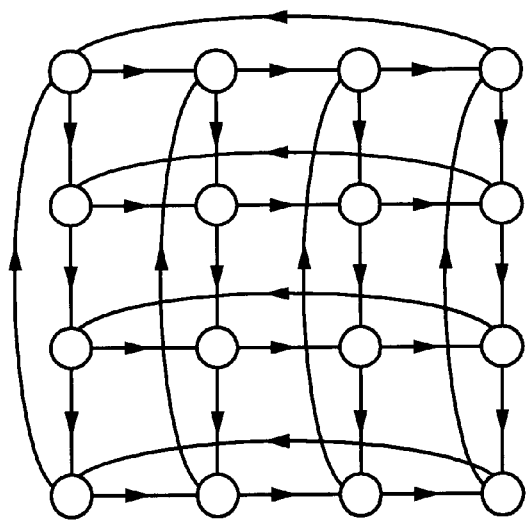
FIG. 4 is a diagram showing the topology of a 4×4 torus network.

The n×n torus network is a regular network with unidirectional links, and the nodes have indegree and outdegree of 2. Logically, the links form a grid on the surface of a torus, and all the links in the n rows or n columns are codirectional. An example of a 4×4 network is shown in FIG. 4. Each node contains a 2×2 crossbar switch or its logical equivalent. In the cross configuration the switch connects the input column to the output column, and the input row to the output row; in the bar configuration the input column is connected to the output row, and the input row is connected to the output column. FIG. 8(a) shows the situation in which all switches are set to the cross position. In that case, the network consists of a set of 2n cycles, each of length n. In the notation here, the n horizontal cycles are denoted $C_{ih}$ where i=0, ... ,n−1, and the n vertical cycles are denoted $C_{jv}$ where j=0, ... ,n−1. This link-disjoint directed-cycle decomposition of the network graph is well suited to the routing method of the present invention. The n×n torus network contains $n^2$ distinct closed directed trails, defined as $T_{ij} = C_{ih} \cup C_{jv}$, with i,j=0,1, ... ,n−1. The cutpoint of trail $T_{ij}$ occurs at the intersection of the component cycles, at the node (i,j); in other words, each of the $n^2$ nodes in the network is the cutpoint of exactly one of the closed directed trails $T_{ij}$. This cycle-decomposition of the network is well suited to the directed-trail routing method of the present invention, because a packet can be routed from its source to its destination, both located anywhere in the network, along a directed trail consisting of a vertical or horizontal cycle or the union of one vertical and one horizontal cycle; therefore the packet must be switched between cycles a maximum of once (at the cutpoint which is the point of connection between the vertical and horizontal cycles). A different cycle-decomposition of the network is obtained when all the switches are set to the bar position, as shown in FIG. 8(b); in that case the network consists of n cycles, each of length 2n. However this cycle decomposition is less well suited to directed-trail routing because a directed trail leading between a source-destination pair may, necessarily, be the union of many cycles.

Figure 10:
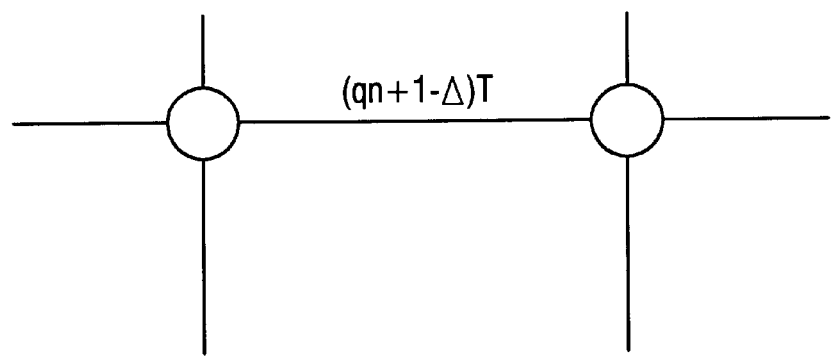
FIG. 10 is a diagram showing the lengths of links connecting adjacent nodes.

The switching operations that maintain a packet on its selected trail leading from its source to its destination can operate in an automatic fashion, without requiring the intermediate nodes to interrogate the packet destination address or to perform any intelligent route selection. The network operates in a slotted fashion with packets constrained to some maximum length, i.e. time is divided into regular time slots which are dimensioned to contain a packet of the maximum allowable size together with a guard and. The crossbar switches in all the routing nodes in the network are arranged to operate in a regular, coherent fashion, locked to a global network clock at the time-slot rate. When the switches change configuration they do so during the guard band so as not to corrupt packets. FIG. 9 is a time diagram showing the packet time slots, each of length T, arranged in frames of length n time slots. In the first $^{n-1}$ time slots in a frame, the crossbar switches are all set in the cross position (denoted c in the diagram); in the final time slot of the frame the switches are all set to the bar position (denoted b). As shown by way of example in FIG. 10, the length of each link connecting a pair of adjacent nodes in the network is selected and controlled so that the signal group time-of-flight is equal to $^{(qn+1-\Delta)T}$ where q is any integer, and $\Delta$ is the phase difference between the clock signals at the two nodes, expressed as a fraction of the time slot period T. In other words, apart from the clock phase difference $\Delta T$, the length of every link in the network is equal to an arbitrary integer number of frames plus one time slot. Thus a packet which exits from a node in the jth time slot of a frame will arrive at the next node in the $(j+1)$th time slot of a frame. More generally, the packet may be advanced or retarded by a fixed integer number of time slots. The packet may be advanced/retarded by any fixed integer number of slots which is not a multiple of n, if n is odd, or by a number which is odd if n is even.

Figure 11:
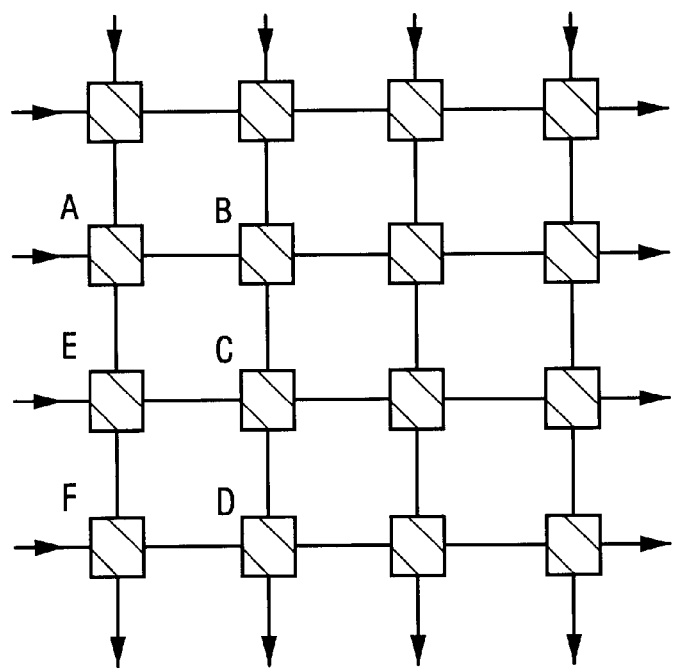
FIG. 11 shows examples of directed-trail routings using switching between horizontal and vertical cycles in the network of FIG. 8.

FIG. 11 shows how a 4×4 torus network might appear to some of the packets travelling inside it. Suppose, in FIG. 11, node A wishes to transmit a packet to node D. The source node A will use a look-up table or some other algorithm to determine that it should transmit the packet along the outward link in the horizontal cycle $C_{2h}$ using a vacant time slot in the third position in a frame (in this example each frame contains 4 slots). On arrival at the next node, B, the packet will find itself in the fourth (i.e. the last) slot in a frame, and therefore the crossbar switch at B will be configured in the bar position, as shown in FIG. 11. The packet is therefore switched into the vertical cycle $C_{1r}$ and progresses onwards through node C (where it is now in the first time slot of a frame, so the switch at C is in the cross state), eventually reaching its destination node D. Not shown in FIG. 11 is an alternative routing; exiting from A along the vertical cycle $C_{0r}$ in the second time slot of a frame, via nodes E and F.

In the torus network, directed-trail routing using the trails $T_{ij}=C_{iji}\cup C_{jv}$ is 100% efficient; i.e. the directed-trail routing gives the shortest path between any source-destination pair. It can be shown that the average shortest-path distance in the n×n torus network is equal to $n^2/(n+1)$ hops. Since the maximum steady-state throughput is given by the indegree of the nodes divided by the average distance taken, it is equal to $2(n+1)/n^2$. Therefore the throughput scales as $O(1/\sqrt{N})$, where $N=n^2$ is the number of nodes, in contrast with one-directional routing where the throughput scales as $O(1/N)$.

As indicated earlier, with directed-trail routing, the only processing operation that a network node is required to perform on incoming packets is simple: the destination address of every incoming packet is examined, and if it corresponds to the address of the node the packet is removed from the network, otherwise it is forwarded. The process of comparing the packet address and the node address is a simple single-word matching operation, and can be performed at high speed; for example, optical recognition of 6-bit address words has been demonstrated recently at a peak rate of 100 Gbit/s [11]. Since the directed-trail routing does not use an algorithm that relies on any particular sequential numbering system for the network nodes, the nodes can be labelled in an entirely arbitrary fashion. This can simplify the tasks of planning, administrating and evolving the network.

Although the description of directed-trail routing in the torus network has assumed, until now, that the network is a complete n×n structure, it is also possible to cope with the situation where a node is missing or a node or link fails. If a node is missing, it is necessary only that the links that bypass this vacant position maintain the correct timing relationship, as shown e.g. in FIG. 10, i.e. in this case the link that bypasses a vacant node position should have a signal group delay of $(qn+2-\Delta)T$ (an integer number of frames plus two time slots minus the phase correction $\Delta T$). Unlike one-dimensional routing methods, the operation of the entire network is not jeopardised by the loss of a link or node. This is because there are two available directed-trail routes between any source-destination pair, provided the source and destination are not located in the same horizontal or vertical cycle. If one directed trail fails, the other available trail can be used instead. If the source and destination are located on the same vertical or horizontal cycle there is no alternative directed-trail routing, but the cycle can be healed by bypassing the defective node or link in the manner just described in the case of a missing node.

Neither is it strictly necessary for the torus network to be square; for example, directed-trail routing can be used in a rectangular network with m rows and n columns, where m>n, say. Then the frame must contain the number of time slots corresponding to the greater dimension (m in this case), and there are m−n missing, or 'phantom', columns in a complete m×m structure. Packets travelling along a row in a time slot corresponding to a phantom cutpoint can remain only within the row. This reduces the network efficiency, but ensures that all the mn real nodes can be accessed.

The network can support both connectionless and connection-oriented modes of operation simultaneously. In connectionless mode, a source can transmit to a chosen destination by inserting packets in a vacant time slot corresponding to a directed trail that leads to the destination. There are no guarantees on the availability of suitable vacant time slots, and communication between the source and destination is transitory. In connection-oriented mode, prior signalling is used to reserve a regular sequence of suitable time slots allowing a connection to be established between, a source-destination pair.

In one-dimensional networks, broadcasting from a given source to every other node in the network can be achieved in a straightforward fashion; a packet which is to be broadcast is copied by each node as it traverses the network. In multi-dimensional networks that do not use predetermined routing tables (such as self-routing algorithms with deflections for contention resolution), broadcasting is not efficient if physical-layer mechanisms are used alone. Unless higher transport-layer protocols are used, to broadcast a packet it is necessary to transmit an individual copy to every node in the network; in other words, physical-layer broadcasting is of complexity O(N), where N is the number of nodes. Whilst transport-layer protocols can be highly effective in low-speed networks, for very high-speed networking the additional delays may be unacceptable. Physical-layer broadcasting in the torus network can be achieved using directed-trail routing by transmitting copies on a set of trails that span the full extent of the network (for example, to broadcast from a node in the ith row of an n×n torus, packet copies could be transmitted on the n trails $T_{ij}=C_{th} \cup \dot{C}_{j}$, where j=0,1,2, . . . ,n−1. This physical-layer broadcasting is of complexity $O(\sqrt{N})$, where $N=n^2$ is the number of nodes.

Figure 2:
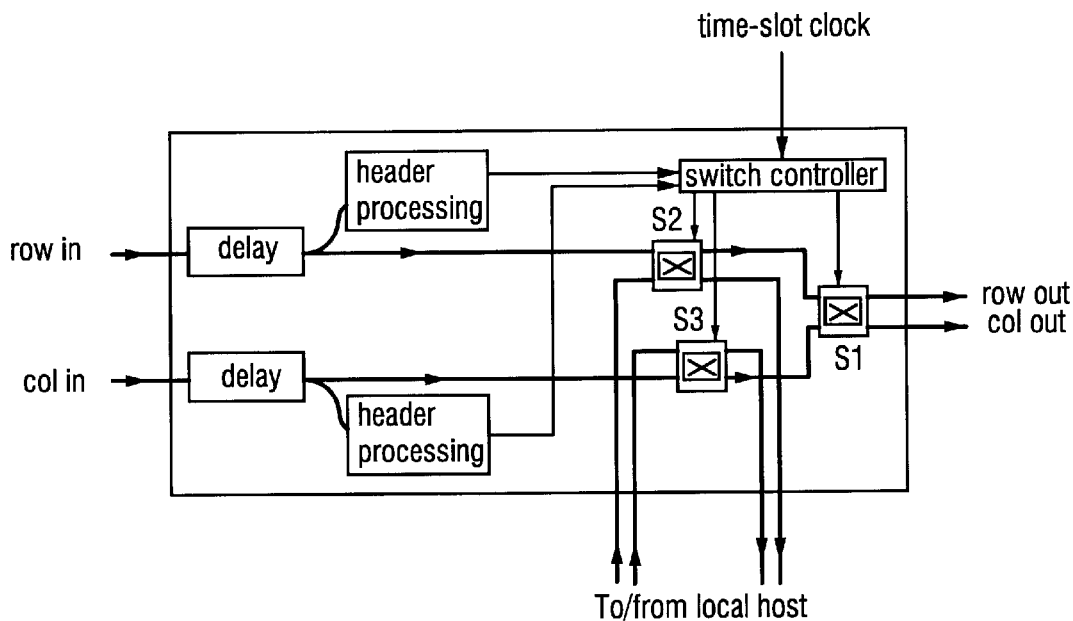
FIG. 2 is a circuit diagram for one of the nodes of FIG. 1.

FIG. 2 shows the structure of a 2-connected node suitable for insertion in the MSN shown in FIG. 4. In a photonic network implementation, the heavy lines shown in FIG. 2 are optical fibre paths. The delay units at the two inputs to the node provide the necessary adjustment on the lengths of the two incoming links to satisfy the requirement described earlier, that on each link connecting a pair of nodes, the signal group time-of-flight along the link should be equal to $(qn+1-\Delta)T$, where q is any integer, and $\Delta$ is the phase difference between the clock signals at the two nodes, expressed as a fraction of the time slot period T. By providing two delay lines (one on each input) with independent compensation for phase differences, it is also possible to ensure that the packets on the two incoming links are correctly synchronised relative to each other and to the time-slot clock at the node. Each delay unit could consist of a combination of: i) a length of fibre cut to a suitable length to provide coarse timing adjustment; ii) a step-adjustable delay line consisting of a chain of 2×2 space switches and fibre delays (such as described in ref [12]) to provide timing adjustment to within a few hundred picoseconds; and iii) a free-space adjustable optical delay line (such as optical delay line type ODL-300-15-SMF manufactured by Santec Corporation) to provide fine adjustment to within a few tens of picoseconds. It may be necessary also to compensate for slow drifts in the optical path length of the incoming links. These drifts may be caused by environmental factor acting on the fibre—for example, movement causing stretch, or temperature variations. This continuous environmental compensation can be achieved by detecting a variation in the relative timing of incoming packet arrivals and the time-slot clock at the node, and providing an electrical feedback control signal to the step-adjustable delay line and the free-space adjustable delay line units.

The header-processing units performs the following tasks: i) detects the presence or absence of a packet in a time slot; ii) detects the time of arrival of a packet; and iii) determines whether or not an incoming packet is addressed to the node. For tasks i) and ii) it is sufficient to use a~1 GHz-bandwidth photodetector to detect a fraction of the packet signal. The presence of a signal from this photodetector during the time slot indicates the presence of a packet. The phase relationship between the time-slot clock and the component of this photodetector signal which is at the time-slot rate can be detected using an electronic phase detection circuit, and a voltage proportional to this phase difference provides the control signal necessary for the feedback control circuit mentioned above. For task iii) it is necessary to compare the address in the packet header with the address of the node. For an ultrafast photonic implementation this can be performed using the method of ultrafast binary word recognition described in the present applicant's international patent application PCT/GB94/00397, with further technical details disclosed in WO 95/33324. The contents of these earlier applications are incorporated herein by reference. An experimental demonstration of this technique is described in ref [11]. As described in the above-cited applications, address words for packets are selected from the subsets of binary words for which the following condition is true for any two words A, B in the subset:
A⊗B=0 only if A=B,
and A⊗B=1 otherwise,
where: A⊗B is the Boolean operation $$\sum_{i=1}^{n} a_i \cdot \overline{b}_i.$$

Word recognition is then carried out using a simple AND operation between an address word from a packet and the complement of the node address. A suitable AND gate is a semiconductor optical amplifier supporting four-wave mixing (FWM).

This method of word recognition provides a binary output signal indicating whether or not the header destination address matches the node address.

The basic space-switching operation is performed by the three crossbar switches. The reason for 3 switches rather than only 1 is that this provides the signal paths needed to connect to and from a local host computer system. Suitable space switches capable of operation in a time of 1 ns or less are lithium niobate devices such as type Y-35-8772-02 supplied by GEC Advanced Components.

Figure 3:
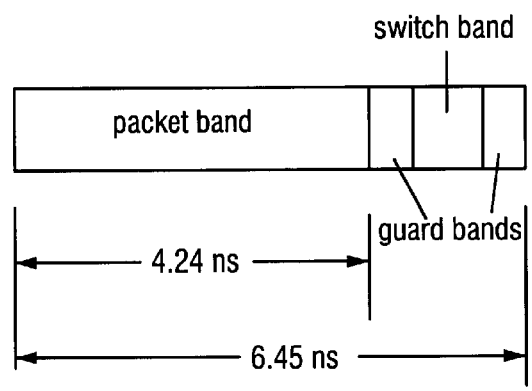
FIG. 3 is a diagram showing the partitioning of a packet time slot.

Suitable partitioning of the packet time slots is shown in FIG. 3. In this example it has been assumed that the time slot clock is at at a rate of 155 MHz (6.45 ns period). This is a standard clock used currently in SDH networks and can be distributed over wide (national) geographical regions with timing jitter of less than 500 ps. It is also assumed in the example shown in FIG. 3 that the packet consists of 53 bytes at 100 Gbit/s (4.24 ns duration), that a suitable switch band for operation of the electro-optic space switches is 1 ns, and in addition there are two time guard bands each of size 0.6 ns. Within the node, the position of the current time slot in the frame can be tracked by an electronic modulo n counter (for a frame n time slots long) which counts the time-slot clock pulses. During the initial start-up phase of the network, and subsequently when time slots are available, one node in the network (designated a master node) can broadcast packets in one fixed position in the frame (such as the first position), so that the counters in other nodes can be reset to the correct phase in synchronism with the master node.

The space switches in the node are activated by the electronic switch controller unit shown in FIG. 2 which acts on the basis of the following information: i) whether or not the position of the time slot in the frame corresponds to a 'cross' or 'bar' configuration in the directed-trail routing cycle (1 bit); ii) whether or not an incoming packet occupies the current time slot (1 bit per input port); iii) whether or not the destination address for an incoming packet matches the address of the node (1 bit per input port); iv) whether or not a packet that is waiting in the host's output buffer wishes to access an output port in the current time slot (1 bit per output port). On the basis of this information, (total 7 bits) the electronic switch controller unit sends electrical drive signals to the space switches in correct synchronism with the time guard bands between packets, and in this way performs the following tasks: i) routes incoming packets to the host or to one of the output ports; ii) routes packets from the host to one of the output ports if the required time slot is vacant. An example of the logic required to perform these tasks is as follows:

if not (current time slot is last position in frame)
    then
        S1:=cross;
if ((incoming row time slot is occupied) and not incoming column time slot is occupied) and not (incoming row packet is addressed to host) and (a host packer is waiting to exit from the row port in the current time slot) and (a host packet is waiting to exit from the column port in the current time slot)) {comment—destination address of vacant incoming column time slot is not defined } then begin
S2:=cross;
S3:=bar;
end;

The routing logic, of which this is an example, is sufficiently simple that it can be executed using hard wiring together with a fast 8-bit decoder chip, without the need for arithmetic, registers or look-up tables. It is purely a logical combination circuit, and therefore the decision time depends only on gate delays. The switch controller unit can therefore operate at high speed, suitable for routing packets in multi-Gbit/s networks.

Figure 6:
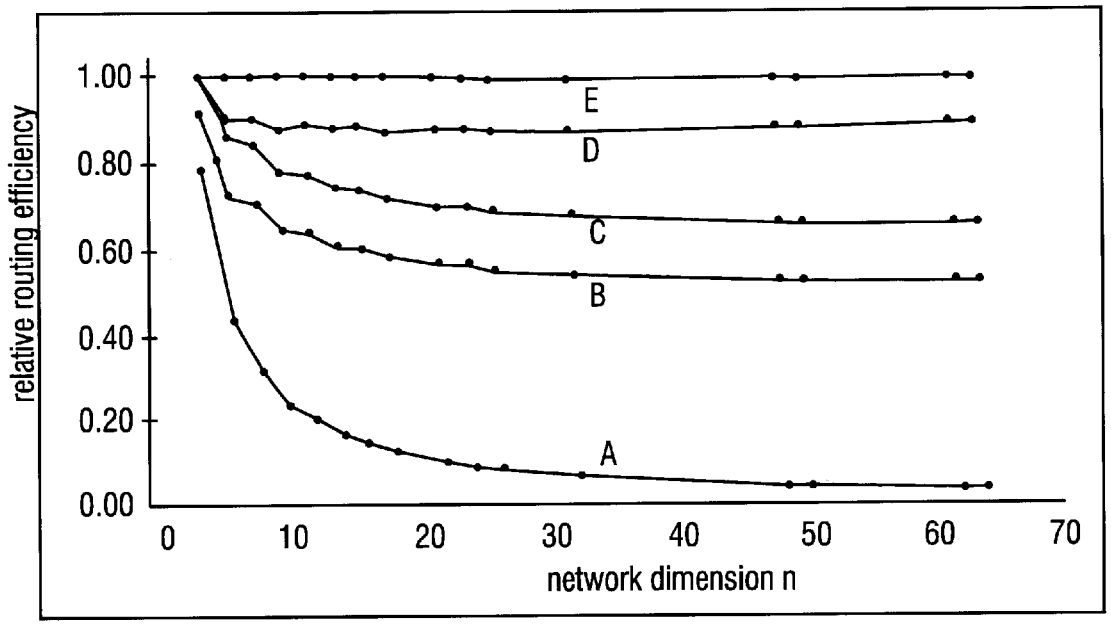
FIG. 6 is a graph showing the efficiency of different routing schemes in n×n torus and n×n MSN networks relative to shortest-path routing in the n×n MSN versus the network dimension n.
Figure 16:
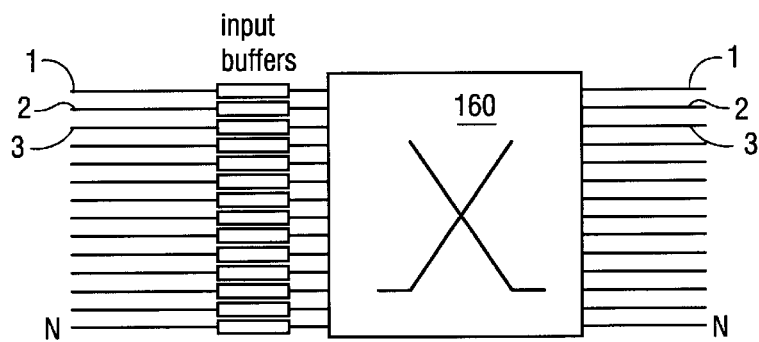
FIG. 16 shows a packet switch.
Figure 17:
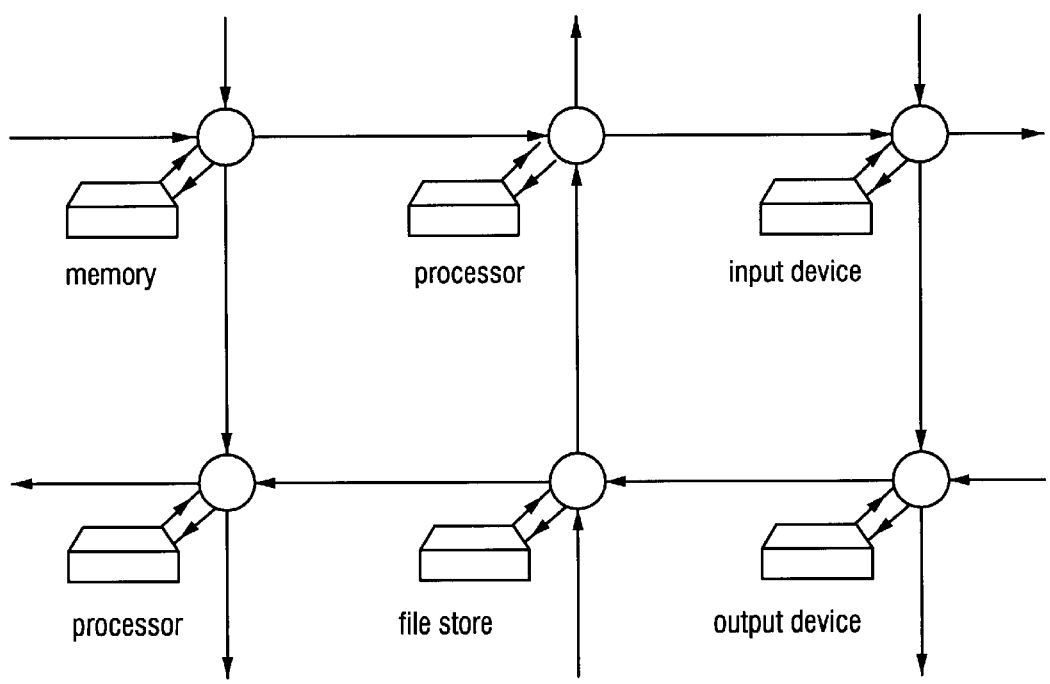
FIG. 17 shows a multiprocessor computer.

The routing method described above offers high efficiency and low latency,: and these advantages are maintained as the number of nodes in the network is scaled upwards. FIG. 6 shows the efficiency of various routing schemes in n×n torus and MSN networks, relative to shortest-path routing in the n×n MSN, as a function of the network dimension n. The various curves are:A, hamiltonian-cycle routing in n×n torus network;B, directed-trail routing in n×n torus network; C, directed-trail routing in n×n MSN; D, dead-reckoning routing in n×n MSN; E,routing in n×n MSN using a routing rule that provides a shortest-path route (Maxemchuk's "first rule"[5]). It can be seen that methods B and C implementing the present invention maintain a relatively high efficiency of 60% or greater as the network size is scaled upwards. The efficiency is markedly greater than hamiltonian-cycle routing which is a one-dimensional routing technique applicable to a torus network. As noted in the introduction above, the present invention may be applied, for example, in a packet switch. FIG. 16 shows an N×N buffered packet switch, in which the interconnect 160 is a network embodying the invention. A further application is illustrated in FIG. 17 which shows a multiprocessor computer in which processors, memory, file stores and I/O ports are connected to respective nodes of a network employing directed-trail routing.

Although the first example described above uses an n×n torus topology, directed trail routing can be used with a wide variety of different network topologies, including topologies which are irregular in form. In the sections which follow, a formal general description of directed trail routing is given and examples of further alternative network topologies are described.

Directed-trail Routing—a General Description

This section gives a general, mathematical description of the directed-trail routing method. The following terms that appear in this section, and elsewhere in the description and claims, are those commonly used and defined in graph theory (see, for example, [8]), and have the meanings normally accorded them in that field: graph, digraph, subgraph, strongly-connected, directed, points, arc, path, trail, to span, indegree, outdegree, eulerian, hamiltonian, cycle, link-disjoint, cycle-decomposition, cutpoint.

The communications network is represented by a strongly-connected digraph [8], denoted G, in which each point uniquely represents a network node, each arc represents a one-directional link between a pair of distinct nodes, and each node is assigned a unique address. In such a digraph, a trail is defined as an alternating sequence of nodes and links, beginning and ending with nodes, in which each link is a directed link from the immediately-preceding node to the immediately-following node, and all the links (but not necessarily all the nodes) are distinct. For every node $n_i$ in G, we define a set $S_i$ of distinct trails such that no single trail spans G, but there is at least one trail in $S_i$ that leads from $n_i$ to any other node in G. To effect the transmission of an information packet from its source $n_i$ to a destination node $n_j$ in G ($n_i \neq n_j$), the source merely attaches the destination address to the packet and despatches the packet on a trail T, selected from $S_i$, which contains $n_j$. For the complete transmission of a packet from its source to its destination, the sole routing decision is that made by the source when T is selected. The routing information needed by the source may be stored in a look-up table. The packet itself carries no routing information, apart from its destination address, and intermediate nodes between the source and destination perform no routing function in reaction to the packet. The only processing operation that network nodes are required to perform on incoming packets is simple: at every node $n_k$ in G, the destination address of every incoming packet is examined; if the packet destination address corresponds to the address of $n_k$ the packet is removed from the network, otherwise it is forwarded. Mechanisms ensure that a packet, once despatched by its source onto a chosen trail, will be forwarded along that trail until removed at the packet destination. Crucially, the operation of these mechanisms at all nodes is entirely independent from the presence or absence of any packet or packet content.

A basis for engineering such routing mechanisms in certain network topologies is now described. It is necessary that the digraph G representing the network is eulerian (i.e., at every point in G the in-degree and out-degree are equal). In fact, as described later, most practical communications networks are eulerian. According to a known theorem in graph theory [9], an eulerian digraph is the union of a set of link-disjoint directed cycles (a directed cycle being a closed alternating sequence of nodes and links, in which each link is a directed link from the immediately-preceding node to the immediately-following node, and all the links and nodes are distinct). This set is a link-disjoint directed-cycle decomposition of G, denoted D(G). We now introduce a further theorem:

Theorem: If two or more arc-disjoint directed cycles are connected, their union is a closed trail.

Figure 7:
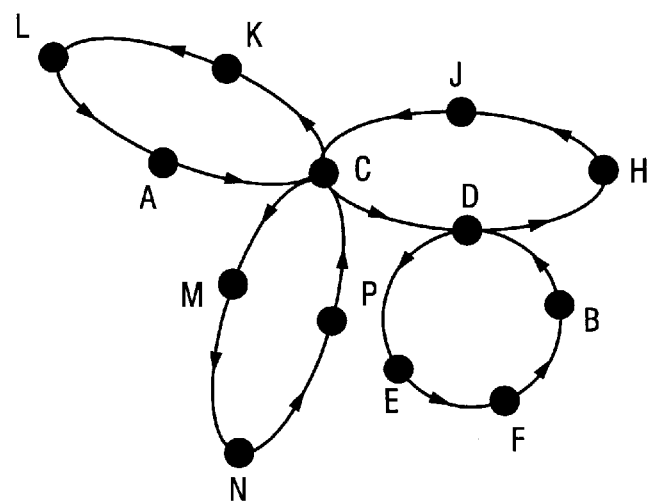
FIG. 7 is a diagram showing connected link-disjoint directed cycles.

Proof: Two arc-disjoint directed cycles are connected if they share a common point x, and their union is a closed trail in which x is a cutpoint (as is self-evident in FIG. 7 in the case of the two cycles CKLAC and CDHJC, for example, which share a common point C, and whose union is the closed trail CKLACDHJC). If this closed trail shares a common point y with a further arc-disjoint directed cycle (where x and y may be the same or differ), then their union is a further closed trail in which y is a cutpoint. (For example, in FIG. 7, the closed trail CKLACDHJC shares a common point D with the cycle DEFBD, and their union is the closed trail CKLACDEFBDHJC.) By extrapolation, the theorem is proved for arbitrary numbers of connected cycles.

It follows that any open trail in G (such as a trail belonging to the set $S_i$, for any $n_i$ in G) is a subgraph of at least one closed trail consisting of a cycle, or the union of several connected cycles, from D(G). (For example, in FIG. 7, the shortest open trail from A to B, namely ACDEFB, is a subgraph of the closed trail CKLACDEFBDHJC which is the union of the connected cycles CKLAC, CDHJC and DEFBD.) Cutpoints in the closed trails occur at every connecting point of the component cycles. Rearrangement of the internal connections between inward and outward links at the various cutpoints cause different trails to be selected. (For example, in FIG. 7, the internal connections within node C can cause each of the inward links AC, PC and JC to be directed onwards to a selected one of the links CK, CM and CD.) To enable automatic trail-routing of packets, switching between the trails in G may be arranged to occur at regular, pre-determined times. A general routing mechanism for forwarding a packet along a selected trail T then consists in ensuring that the initial dispatch of the packet from its source is synchronised with prescheduled switching at the cutpoints. This prescheduled switching is arranged to occur in a synchronised, temporally coherent fashion throughout the network. This method of packet routing is illustrated by the examples described in the preceding and following sections.

As already stated, for this routing mechanism to work, the network must have an eulerian topography. It turns out that this is true for a very wide range of communications networks. Many networks are symmetric in the graphical sense (a digraph is symmetric if, for every link uv within it, there is also a link vu [10]), and are therefore eulerian. In a symmetric network each pair of symmetric links connecting two adjacent nodes forms a cycle, and according to the theorem stated above, the union of an arbitrary number of such cycles, provided they are connected, forms a closed trail. An example of a regular symmetric network is an n-dimensional mesh with bidirectional pairs of links. The links in all router networks and wide-area telecommunications networks occur in symmetric pairs, and so these networks could in principle support directed-trail routing, although the network topologies are usually highly irregular and therefore this method of routing is likely to be inefficient. However, many of the topologies of greatest interest for multi-processor interconnection are regular eulerian networks, either symmetric (such as the n-dimensional meshes with bidirectional links) or oriented (i.e. having no symmetric pair of directed links, such as the k-ary n-cubes), and are therefore well suited to directed-trail routing. Examples of the k-ary n-cubes are the torus networks and hypercubes.

The routing mechanism is illustrated below by various examples: the k-ary 2-cube (k×k torus network); the reverse k-ary 2-cube (k×k reverse-torus network, also known as the Manhattan-Street network); a regular 2-dimensional n×n mesh with bidirectional links; and the 2-ary n-cube (hypercube). The torus and reverse-torus networks are considered in some detail.

Directed trail routing offers many of the advantages of one-dimensional routing while overcoming the limited efficiency of such techniques. One-dimensional routing may be carried out in one-dimensional networks—e.g. single-directional or bidirectional busses or rings—or using hamiltonian cycles. In both directed-trail routing and one-dimensional routing, the source node selects the entire trail from the source to the destination before sending the packet. Intermediate nodes need perform no routing function in reaction to a packet, and this greatly simplifies the design of the nodes. This also eliminates contention within the transmission path; this removes the necessity for contention resolution using internal network buffers or deflection-routing strategies, which introduce delay variations and can undesirably rearrange a packet sequence. Because neither complex processing of packet-header data nor buffering is required at routing nodes, the networks are also well suited to all-optical implementations, which allow higher transmission bandwidth and lower delay. However, the disadvantage in the case of one-dimensional routing is that the source must make a choice between at most two available paths, each of which span all the network nodes. This results in a relatively high average source-destination distance of O(N), where N is the number of nodes in G. Since the theoretical maximum throughput in the steady state is inversely proportional to the average source-destination distance, the throughput is relatively poor. On the other hand, in, the case of directed-trail routing in a well-chosen network topology, there can be a multiplicity of directed trails leading from the source, each of which spans only a subset of the nodes in G, and the source is required to select a trail which contains the required destination node for the packet. This results in a lower average source-destination distance, and consequently the throughput is significantly improved relative to one-dimensional routing. As in the case of one-dimensional routing, networks based on directed-trail routing can support both connection-oriented and connectionless modes of communication. In connection-oriented mode, quality-of-service guarantees on bandwidth and delay can be provided. Also, broadcasting is simplified.

Manhattan Street Network (MSN)

Figure 5:
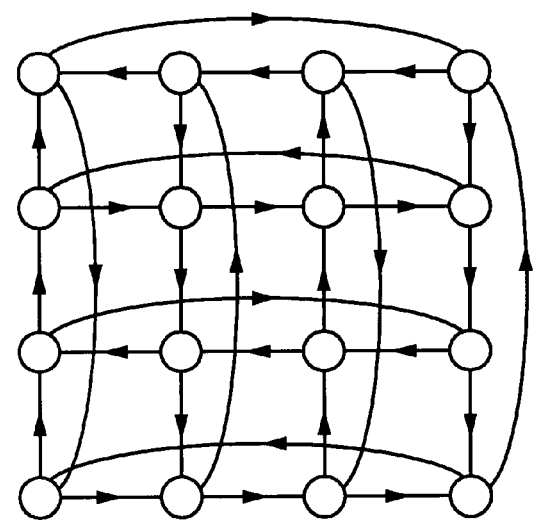
FIG. 5 is a diagram showing the topology of a 4×4 Manhattan Street Network IMSN)

The n×n MSN is a regular network with unidirectional links, and the nodes have indegree and outdegree of 2. Logically, the links form a grid on the surface of a torus. The MSN differs from the torus network in that the links in adjacent rows or columns travel in opposite directions, and the MSN is defined only in the case that the numbers of rows and columns are even. An example of a 4×4 network is shown in FIG. 5. The routing scheme for the MSN using directed trails $T_{ij}=C_{ih}\cup C_{jv}$ is closely similar to the torus network; the main difference is that alternate horizontal or vertical cycles have opposite orientation. Unlike in the torus network, the relative routing efficiency of directed-trail routing in the MSN (compared to shortest-path routing) is less than 100%. However, the average shortest-path distance in the MSN is less than in the torus network of equal size (approaching a factor of 2 shorter for large networks). The shortest directed-trail distances between source-destination pairs in the MSN depends on the relative orientations of the inward and outward links at the nodes, and the formulae are set out in Table 1. Using these formulae, the relative routing efficiency (relative to shortest-path routing) can be calculated, and the results are presented in FIG. 6. These show that directed-trail routing in the MSN, although less efficient than a shortest-path algorithm (such as Maxemchuk's 'first rule') or the dead-reckoning method, is still good. In particular, the routing efficiency for directed-trail routing in large MSNs is around 0.65.

| Source node orientation | Destination node orientation | Shortest directed-trail distances (the lesser if two expressions are given) |
|---|---|---|
| down and right | down and right | (dr-sr) mod n + (dc-sc) mod n |
|  | down and left | (dr-sr) mod n + (dc-sc) mod n |
|  |  | n − (dc-sc) mod n + (dr-sr) mod n |
|  | up and left | (dc-sc) mod n + n − (dr-sr) mod n |
|  |  | n − (dc-sc) mod n + (dr-sr) mod n |
|  | up and right | (dc-sc) mod n + n − (dr-sr) mod n |
|  |  | (dc-sc) mod n + (dr-sr) mod n |
| down and left | down and right | (dc-sc) mod n + (dr-sr) mod n |
|  |  | n − (dc-sc) mod n + (dr-sr) mod n |

-continued

| Source node orientation | Destination node orientation | Shortest directed-trail distances (the lesser if two expressions are given) |
|---|---|---|
| | down and left | (dc-sc) mod n + (dr-sr) mod n |
| | up and left | (dc-sc) mod n + n − (dr-sr) mod n (dc-sc) mod n + (dr-sr) mod n |
| | up and right | (dc-sc) mod n + n − (dr-sr) mod n n − (dc-sc) mod n + (dr-sr) mod n |
| up and left | down and right | (dc-sc) mod n + n − (dr-sr) mod n n − (dc-sc) mod n + (dr-sr) mod n |
| | down and left | (dc-sc) mod n + n − (dr-sr) mod n (dc-sc) mod n + (dr-sr) mod n |
| | up and left | (dc-sc) mod n + (dr-sr) mod n |
| | up and right | (dc-sc) mod n + (dr-sr) mod n n − (dc-sc) mod n + (dr-sr) mod n |
| up and right | down and right | (dc-sc) mod n + n − (dr-sr) mod n (dc-sc) mod n + (dr-sr) mod n |
| | down and left | (dc-sc) mod n + n − (dr-sr) mod n n − (dc-sc) mod n + (dr-sr) mod n |
| | up and left | (dc-sc) mod n + (dr-sr) mod n n − (dc-sc) mod n + (dr-sr) mod n |
| | up and right | (dc-sc) mod n + (dr-sr) mod n |

TABLE 1: Shortest directed-trail distances between source-destination pairs in the n×n MSN. For the purposes of these formulae only, the rows and columns are each numbered sequentially 0,1, . . . ,n−1. Even numbered rows are oriented towards the 'right'; odd numbered rows are oriented towards the 'left'. Even numbered columns are oriented in the 'down' direction; odd numbered columns are oriented in the 'up' direction. The source is located at the intersection of row sr and column sc; similarly the destination is located at the intersection of row dr and column dc. If, for example, sr is even and sc is odd, the source node orientation is called 'up and right'.

FIG. 6 also allows a comparison between the efficiencies of directed-trail routing in the MSN and torus network of the same dimensions. It should be noticed that all the curves in FIG. 6 indicate the efficiencies of various routing schemes relative to the efficiency of shortest-path routing in a MSN. Although (as described in the previous example) directed-trail routing in the torus network successfully finds the shortest-path routing with 100% accuracy, this routing still has a lower relative efficiency than directed-trail routing in the MSN; this is because the average shortest-path distance in the MSN is significantly less than the average shortest-path distance in the torus network (by a factor approaching 2 for large networks).

The maximum theoretical throughput in the steady state for the MSN is equal to the indegree of the nodes (2) divided by the average shortest-path distance. The throughput obtainable with directed-trail routing is equal to 2 divided by the average distance travelled, or expressed another way, the throughput obtainable is equal to the maximum theoretical throughput multipled by the routing efficiency (around 65% for large networks).

2-dimensional Mesh With Bidirectional Links

Figure 12:
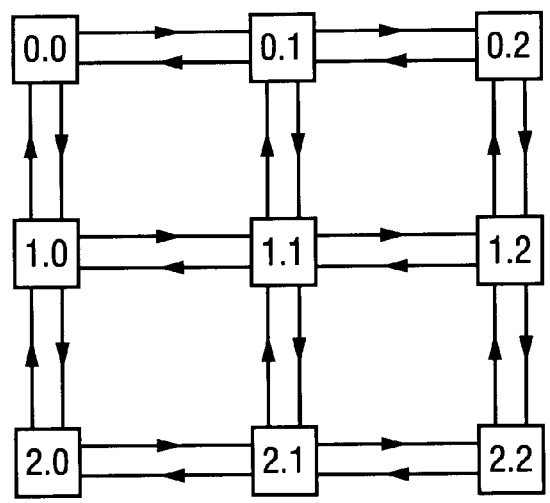
FIG. 12 shows a two-dimensional 3×3 mesh with bidirectional links.
Figure 13:
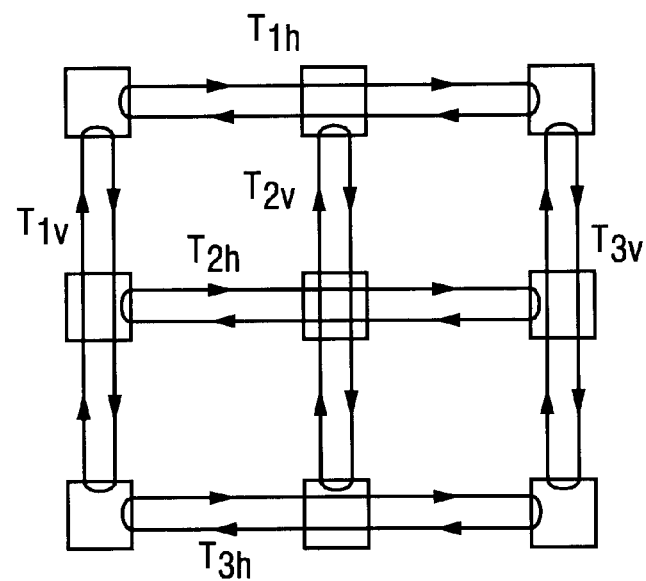
FIG. 13 shows the network of FIG. 12 with the switches in the cross position.
Figure 14:
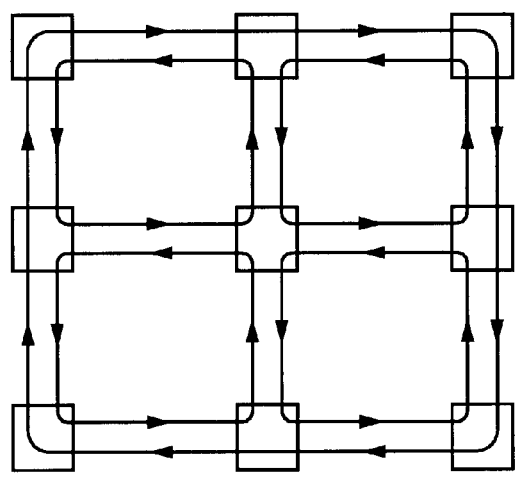
FIG. 14 shows the network of FIG. 12 with the switches in the bar position.

FIG. 12 shows a two-dimensional 3×3 mesh with bidirectional links. This is an example of a network which is symmetric in the graphical sense (defined earlier) because for every link there is a corresponding link with the opposite orientation, forming a symmetric pair. Each node contains a space switch that can be configured in the cross or bar position. FIG. 13 shows the configuration of the network when all the switches are in the cross position. In this case, the network is composed of a set of closed trails ($T_{1h}$, $T_{1v}$, and so on), each trail consisting of the union of cycles formed from symmetric pairs. FIG. 14 shows the configuration when all the switches are in the bar position. A set of closed trails that can be used for directed-trail routing then consist of the union of one horizontal trail (such as $T_{1h}$) and one vertical trail (such as $T_{1v}$). Directed trail routing is then obtained with a timing scheme similar to that described for routing in the torus network. In this case the frames should be of length 2n−2 time slots, for an n×n mesh with bidirectional links (e.g. in the example given of a 3×3 network, the frame length is 4 time slots), and the frame consists of 2n−1 'cross' time slots and one 'bar' time slot. This allows directed-trail routing between any source and any destination in the network.

Hypercube

Figure 15:
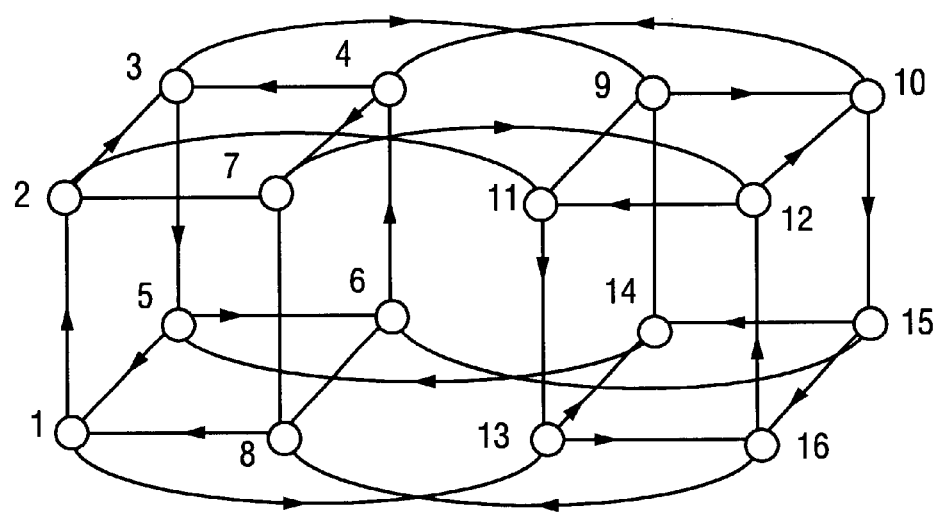
FIG. 15 shows a 2-ary 4-cube hypercube network.

FIG. 15 shows a 2-ary 4-cube, which is an example of a hypercube network. Like the torus and Manhattan-street networks, the hypercube is an example of an oriented graph (one not having symmetric pairs of links). The nodes are all 2-connected, and contain 2×2 crossbar space switches. FIG. 15 also shows a directed-cycle decomposition of the network. The network is composed of 4 cycles: 1,2,3,9,10,15, 16,8,1; 1,13,16,12,10,4,3,5,1; 2,7,8,6,15,14,9,11,2; and 5,6, 4,7,12,11,13,14,5. A set of closed trails that can be used for directed-trail routing in this network consist of the union of any 2 out of these 4 cycles. Directed trail routing is the obtained with a timing scheme similar to that described for routing in the torus network. In this example the frames should be of length 4 time slots, and the frame consists of 3 'cross' time slots and one 'bar' time slot. This allows directed-trail routing between any source and any destination in the network. For example, supposing the node labelled 1 in FIG. 15 is a source of packets. Then a packet transmitted from the source node 1 along the link towards node 2 in the first time slot of a frame will be forwarded along the closed trail 1,2,3,9,11,2,7,8,1. A packet transmitted from the source node 1 along the link towards node 13 in the first time slot of a frame will be forwarded along the closed trail 1,13,16,12,1 1,13,14,5,1. A packet transmitted from the source node 1 along the link towards node 2 in the second time slot of a frame will be forwarded along the closed trail 1,2,3,5,1,13,16,8,1. A. packet transmitted from the source node 1 along the link towards node 13 in the second time slot of a frame will be forwarded along the closed trail 1,13,16, 8,1,2,3,5,1. A packet transmitted from the source node 1 along the link towards node 2 in the third time slot of a frame will be forwarded along the closed trail 1,2,7,8,6,15,16,8,1. A packet transmitted from the source node 1 along the link towards node 13 in the third time slot of a frame will be forwarded along the closed trail 1,13,14,5,6,4,3,5,1. A packet transmitted from the source node 1 along the link towards node 2 in the fourth time slot of a frame will be forwarded along the closed trail 1,13,16,12,10,15,16,8,1. A packet transmitted from the source node 1 along the link towards node 13 in the fourth time slot of a frame will be forwarded along the closed trail 1,2,3,9,10,4,3,5,1.

References

[1] Steenstrup, M. (ed.): *Routing in Communications Networks*, Prentice Hall, 1995
[2] Partridge, C.: *Gigabit Networking*, Addison-Wesley, 1994
[3] Baransel, C., Dobosiewicz, W. and Gburzynski, P.: 'Routing in Multihop Packet Switching Networks-Gb/s Challenge', *IEEE Network*, May/June 1995, pp. 38–61
[5] Maxemchuk, N. F.: 'Routing in the Manhattan Street Network', *IEEE Transactions on Communications*, 35, pp. 503–512 (1987)

[6] PCT/GB 96/01823; Cotter, D. and Tatham, M.C.: 'Dead Reckoning—A Primitive and Efficient Self-Routing Protocol for Ultrafast Mesh Networks', paper submitted for publication
[7] Borgonovo, F.: 'Deflection Routing', Chapter 9 in [1]
[8] Harary, F.: *Graph Theory*, Addison-Wesley, Reading, Mass., 1969
[9] Harary F., Norman, R. Z. and Cartwright, D: *Structural Models: An Introduction to the Theory of Directed Graphs*, John Wiley, New York, 1965, p. 330
[10] ibid., p. 11
[11] Cotter, D., Lucek, J. K., Shabeer, M., Smith, K., Rogers, D. C., Nesset, D. and Gunning, P.: 'Self-Routing of 100 Gbit/s Packets Using 6-Bit 'Keyword' Address Recognition', *Electronics Letters*, 31, pp. 2201–2202 (1995)
[12] P R Prucnal et al (IEEE J Quantum Electronics, vol 29, no 2, pp. 600–612, 1993)

What is claimed is:

1. An optical communications network, comprising:
   a) means for selecting a time slot for a packet in dependence upon the desired path for the packet through the network;
   b) means for outputting the packet onto the network at a source node in the time slot selected by the means for selecting;
   c) means for switching repeatedly with a fixed periodicity the routing states of a multiplicity of routing nodes;
   d) at the network nodes, means for switching the packet to different outputs according to the routing state of the respective node in the time slot in which the packet arrives at the node; and
   e) means for receiving the packet at a destination node.

2. A method of routing an optical packet from a source node to a destination node in an optical communications network, comprising:
   a) selecting a time slot for a packet in dependence upon the desired path for the packet through the network;
   b) outputting the packet onto the network at a source node in the time slot selected in step (a);
   c) switching repeatedly with a fixed periodicity the routing states of a multiplicity of routing nodes;
   d) as the packet traverses the network, at the different nodes switching the packet to different outputs according to the routing state of the respective node in the time slot in which the packet arrives at the node; and
   e) receiving the packet at a destination node.

3. A method of routing a packet in a communications network, the network comprising a multiplicity of nodes and links, and wherein the nodes and links are configured as a multiplicity of directed trails, each directed trail linking only some of the multiplicity of nodes and the directed trails in combination spanning every node of the network, the method comprising the steps of:
   a) selecting a directed trail T from the multiplicity of directed trails in dependence upon the destination of a packet, the selected trail including the source node and destination node of the packet;
   b) outputting the packet at the source node onto the selected one of the multiplicity of directed trails;
   c) reading, at each intermediate node traversed by the packet, a destination address carried in the packet; and
   d) if the packet is addressed to another node, forwarding the packet in a direction that is predetermined and independent of any address information carried by the packet;
   wherein each directed trail in the network is a subgraph of at least one closed directed trail and includes a-directed cycle or union of a plurality of connected directed cycles from a link-disjoint directed-cycle decomposition of the network.

4. A method according to claim 3, wherein the packet is an optical packet carried on a photonic network.

5. A method according to claim 3, wherein the step of selecting a directed trail T includes synchronizing the initial dispatch of the packet with prescheduled switching at an intermediate node.

6. A method according to claim 3, wherein the nodes switch in synchronism throughout the network between pre-scheduled predetermined switching states.

7. A method of routing a packet in a communications network, the network comprising a multiplicity of nodes and links, and wherein the nodes and links are configured as a multiplicity of directed trails, each directed trail linking only some of the multiplicity of nodes and the directed trails in combination spanning every node of the network, the method comprising the steps of:
   a) selecting a directed trail T from the multiplicity of directed trails in dependence upon the destination of a packet, the selected trail including the source node and destination node of the packet;
   b) outputting the packet at the source node onto the selected one of the multiplicity of directed trails;
   c) reading, at each intermediate node traversed by the packet, a destination address carried in the packet; and
   d) if the packet is addressed to another node, forwarding the packet in a direction that is predetermined and independent of any address information carried by the packet;
   wherein switching occurs at a point of connection between cycles from a link-disjoint directed-cycle decomposition of the network.

8. A method according to claim 7, wherein the packet is an optical packet carried on a photonic network.

9. A method according to claim 7, wherein the step of selecting a directed trail T includes synchronizing the initial dispatch of the packet with prescheduled switching at an intermediate node.

10. A method according to claim 7, wherein the nodes switch in synchronism throughout the network between pre-scheduled pre-determined switching states.

11. A method of routing a packet in a communications network, the network comprising a multiplicity of nodes and links, and wherein the nodes and links are configured as a multiplicity of directed trails, each directed trail linking only some of the multiplicity of nodes and the directed trails in combination spanning every node of the network, the method comprising the steps of:
   a) selecting a directed trail T from the multiplicity of directed trails in dependence upon the destination of a packet, the selected trail including the source node and destination node of the packet;
   b) outputting the packet at the source node onto the selected one of the multiplicity of directed trails;
   c) reading, at each intermediate node traversed by the packet, a destination address carried in the packet; and
   d) if the packet is addressed to another node, forwarding the packet in a direction that is predetermined and independent of any address information carried by the packet;

wherein the nodes switch in synchronism throughout the network between pre-scheduled pre-determined switching states; and a timing sequence for the prescheduled switching of intermediate nodes comprises a frame divided into a plurality of time slots and a source node outputs a packet onto the network in a selected one of a plurality of time slots within a timing frame, and the length of the link between successive nodes in a trail is such that a packet leaving one node in a first time slot arrives at the next successive node in a second time slot.

12. A method according to claim 11, wherein the length of the link is such that on travelling between the successive nodes the packet is advanced or retarded by one time slot.

13. A method according to claim 11, wherein the packet is an optical packet carried on a photonic network.

14. A method according to claim 11, wherein the step of selecting a directed trail T includes synchronizing the initial dispatch of the packet with prescheduled switching at an intermediate node.

15. A communications network, comprising:

a) a multiplicity of nodes including at least one source node, at least one destination node, and a plurality of intermediate links therebetween, the nodes and the links being configured as a multiplicity of directed trails, each directed trail spanning some of the multiplicity of nodes, the multiplicity of directed trails in combination spanning every node of the network, each source node being connected to each destination node by a respective directed trail;

b) means for selecting a directed trail T from the multiplicity of directed trails in dependence upon the destination of a packet, the selected trail including the source node and destination node of the packet;

c) means for outputting the packet at the source node onto the selected one of the multiplicity of directed trails;

d) means, associated with each intermediate node, for reading a destination address carried by an arriving packet; and e) means for determining if the arriving packet is addressed to an intermediate node, and if the packet is addressed to another node, means arranged to forward the packet in a direction that is predetermined and independent of any address information carried by the packet;

wherein each directed trail in the network is a subgraph of at least one closed directed trail and includes a directed cycle or union of a plurality of connected directed cycles from a link-disjoint directed-cycle decomposition of the network.

16. A communications network as in claim 15, further comprising an input for receiving packets for transmission on the network.

17. A communications network according to claim 15, wherein the network is a photonic network arranged to carry optical packets.

18. A communications network according to claim 15, wherein a source node is arranged to synchronize the initial dispatch of a packet with prescheduled switching at an intermediate node.

19. A network according to claim 15, wherein the nodes are arranged to switch in synchronism throughout the network between switching states that are pre-scheduled and pre-determined.

20. A communications network, comprising:

a) a multiplicity of nodes including at least one source node, at least one destination node, and a plurality of intermediate links therebetween, the nodes and the links being configured as a multiplicity of directed trails, each directed trail spanning some of the multiplicity of nodes, the multiplicity of directed trails in combination spanning every node of the network, each source node being connected to each destination node by a respective directed trail;

b) means for selecting a directed trail T from the multiplicity of directed trails in dependence upon the destination of a packet, the selected trail including the source node and destination node of the packet;

c) means for outputting the packet at the source node onto the selected one of the multiplicity of directed trails;

d) means, associated with each intermediate node, for reading a destination address carried by an arriving packet; and e) means for determining if the arriving packet is addressed to an intermediate node, and if the packet is addressed to another node, means arranged to forward the packet in a direction that is predetermined and independent of any address information carried by the packet;

wherein switching occurs at a point of connection between cycles from a link-disjoint directed-cycle decomposition of the network.

21. A communications network as in claim 20, further comprising an input for receiving packets for transmission on the network.

22. A communications network according to claim 20, wherein the network is a photonic network arranged to carry optical packets.

23. A communications network according to claim 20, wherein the nodes are arranged to switch in synchronism throughout the network between switching states that are pre-scheduled and pre-determined.

24. A communications network, comprising:

a) a multiplicity of nodes including at least one source node, at least one destination node, and a plurality of intermediate links therebetween, the nodes and the links being configured as a multiplicity of directed trails, each directed trail spanning some of the multiplicity of nodes, the multiplicity of directed trails in combination spanning every node of the network, each source node being connected to each destination node by a respective directed trail;

b) means for selecting a directed trail T from the multiplicity of directed trails in dependence upon the destination of a packet, the selected trail including the source node and destination node of the packet;

c) means for outputting the packet at the source node onto the selected one of the multiplicity of directed trails;

d) means, associated with each intermediate node, for reading a destination address carried by an arriving packet; and e) means for determining if the arriving packet is addressed to an intermediate node, and if the packet is addressed to another node, means arranged to forward the packet in a direction that is predetermined and independent of any address information carried by the packet;

wherein the nodes are arranged to switch in synchronism throughout the network between switching states that are pre-scheduled and pre-determined;

a timing sequence for the prescheduled switching of intermediate nodes comprises a frame divided into a plurality of time slots;

a source node is arranged to output a packet onto the network in a selected one of a plurality of time slots within a timing frame; and the length of the directed link between successive nodes in a trail is such that a packet leaving one node in a first time slot arrives at the next successive node in a second time slot.

25. A communications network as in claim 24, further comprising an input for receiving packets for transmission on the network.

26. A communications network according to claim 24, wherein the network is a photonic network arranged to carry optical packets.

27. A communications network according to claim 24, wherein a source node is arranged to synchronize the initial dispatch of a packet with prescheduled switching at an intermediate node.

28. A communications network according to claim 24, wherein the nodes are arranged to switch in synchronism throughout the network between switching states that are pre-scheduled and pre-determined.

29. In a communications network having a plurality of nodes, including a source node and a destination node, a plurality of links connecting the nodes, the nodes and links having a configuration such that they form a plurality of directed trails, the configuration of the nodes and links being time-dependent such that paths traced by the directed trails change sequentially over time, each directed trail linking only some of the nodes, the directed trails in combination spanning every node of the network, the method of routing a packet comprising:

emitting a packet from a source node;

wherein time of the emission of the packet being dependent upon the destination node where the packet is to be received; and the configuration of the nodes and links changes with time according to a predetermined cycle.

30. A communications network according to claim 20, wherein a source node is arranged to synchronize the initial dispatch of a packet with prescheduled switching at an intermediate node.

\* \* \* \* \*